(12) United States Patent
Nabert et al.

(10) Patent No.: US 6,951,360 B2
(45) Date of Patent: Oct. 4, 2005

(54) FOOT REST MOUNTABLE ON A MOTOR VEHICLE FLOOR

(75) Inventors: Bernd Nabert, Schopfloch (DE); Erwin Lutz, Schwieberdingen (DE); Frank Diehm, Kirchheim (DE)

(73) Assignee: Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/879,137

(22) Filed: Jun. 30, 2004

(65) Prior Publication Data

US 2005/0134077 A1 Jun. 23, 2005

(30) Foreign Application Priority Data

Dec. 19, 2003 (DE) .......................... 103 59 766

(51) Int. Cl.⁷ .............................................. B60N 3/06
(52) U.S. Cl. .............. 296/75; 296/187.05; 296/187.08; 280/751; 180/90.1
(58) Field of Search ........................ 296/75, 187.05, 296/187.08, 193.07; 297/423.41; 180/90.1; 280/748, 751

(56) References Cited

U.S. PATENT DOCUMENTS

| | | | | |
|---|---|---|---|---|
| 4,310,193 A | * | 1/1982 | Kolleas ...................... | 296/75 |
| 6,220,643 B1 | * | 4/2001 | Kato ........................... | 296/75 |
| 6,502,905 B2 | * | 1/2003 | Cheris et al. ............ | 297/423.46 |
| 6,578,867 B2 | * | 6/2003 | Khoudari et al. ......... | 280/730.1 |
| 6,634,694 B2 | * | 10/2003 | Matsushita ................ | 296/75 |
| 6,761,389 B2 | * | 7/2004 | Akasaka et al. .......... | 296/75 |

FOREIGN PATENT DOCUMENTS

| | | |
|---|---|---|
| DE | 29721981 U1 | 5/1999 |
| DE | 19806690 A1 | 9/1999 |
| DE | 19951121 A1 | 4/2001 |
| GB | 2338932 A | 1/2000 |

* cited by examiner

Primary Examiner—Patricia L. Engle
Assistant Examiner—Greg Blankenship
(74) Attorney, Agent, or Firm—Crowell & Moring LLP

(57) ABSTRACT

A foot rest mountable on a motor vehicle floor has a foundation with a mounting surface, a footboard, and a fastening apparatus acting between the foundation and the footboard that holds the footboard on the mounting surface. The fastening apparatus has a lower, first fastening element constructed in the form of a rigid back-reaching element and an upper, second fastening element. For short installation times of the footboard on the foundation, the fastening apparatus is additionally provided with a third fastening element constructed as a rigid back-reaching element, and the upper fastening element is constructed as a slide blocking element that blocks a relative displacement between the footboard and the mounting surface.

30 Claims, 2 Drawing Sheets

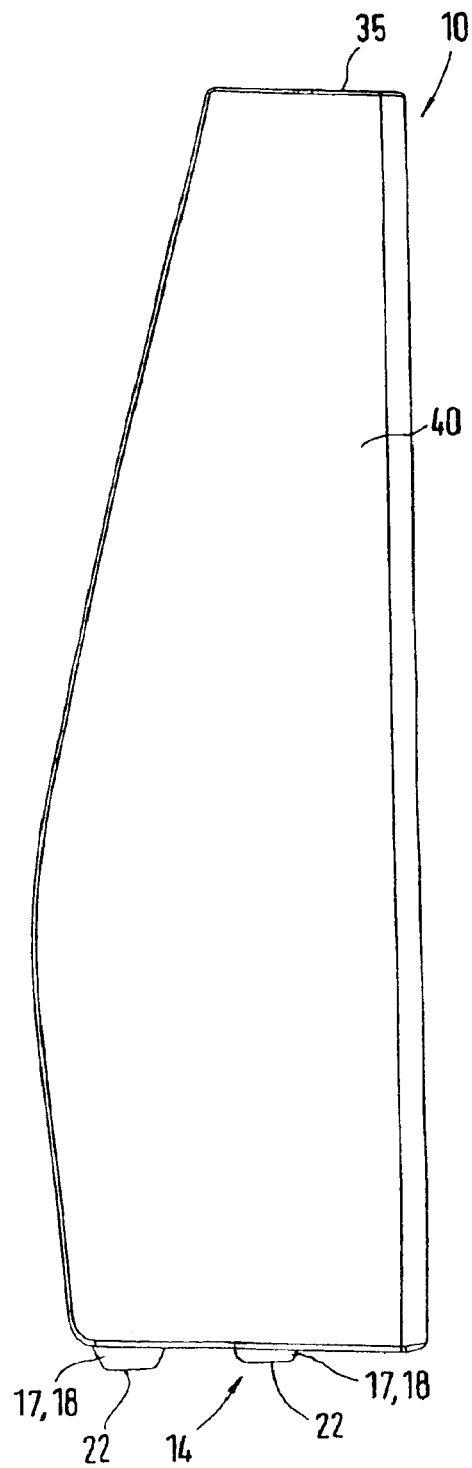
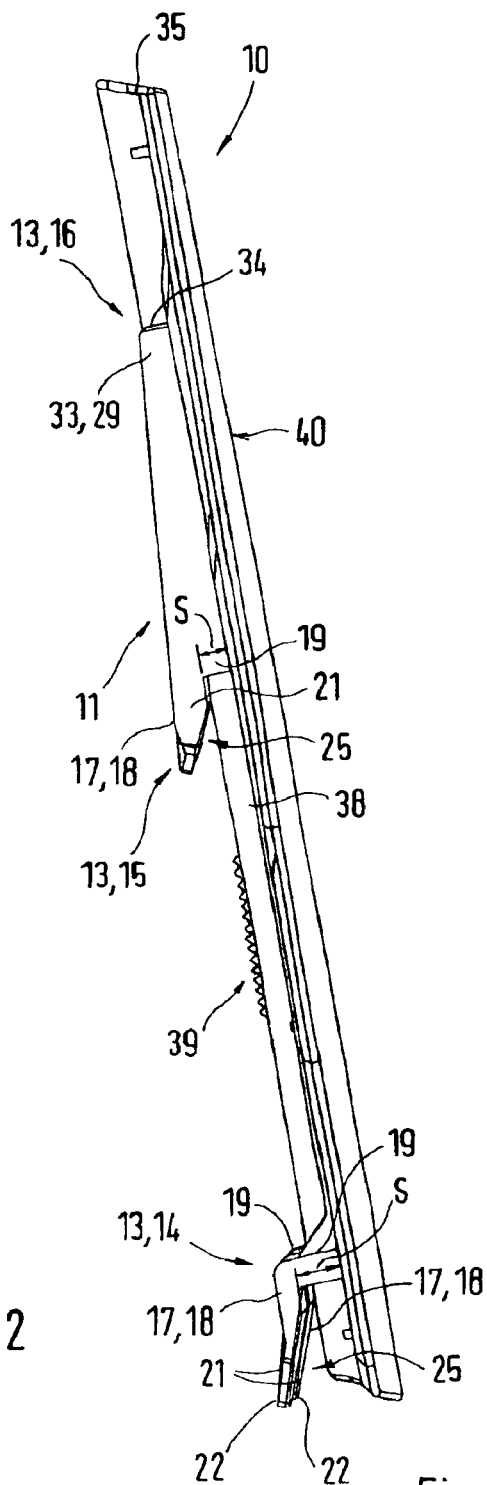
Fig. 2
Fig. 3

FOOT REST MOUNTABLE ON A MOTOR VEHICLE FLOOR

This application claims the priority of German application 103 59 766.2, filed Dec. 19, 2003, the disclosure of which is expressly incorporated by reference herein.

BACKGROUND AND SUMMARY OF THE INVENTION

The present invention concerns a foot rest which is mountable on a motor vehicle floor and having a foundation with a mounting surface, a footboard, and a fastening apparatus operating between the foundation and the footboard which holds the footboard on the mounting surface, with the fastening apparatus having a lower, first fastening element constructed as a rigid back-reaching element and an upper, second fastening element.

A representative foot rest can be found in German document DE 199 51 121 A1 and includes a foundation which can be fastened on the motor vehicle floor. The foundation possesses an mounting surface on which a footboard can be attached. For this purpose, a fastening apparatus is provided between the foundation and the footboard, which in the known foot rest has a lower, rigid back-reaching element as a first fastening element which penetrates the mounting surface and reaches behind a projection provided on the foundation. In addition to such a hook-like fastening, the fastening apparatus also has an upper, second fastening element which is constructed in the form of a screw that penetrates the footboard and is fixed into position in the motor vehicle floor.

Furthermore, British document GB 23 38 932 discloses a foot rest which is held on two straps projecting from the motor vehicle floor with spring-loaded latching elements.

An object of this invention is to provide a foot rest of the type set forth above which, on one hand, fastens securely and which, on the other hand, provides for reduced installation time.

This object is accomplished with a foot rest mountable on a motor vehicle floor that includes a fastening apparatus which additionally possesses, between the upper and lower fastening elements, a third fastening element constructed as a rigid back-reaching element, and in which the upper fastening element is constructed as a slide blocking element that blocks a relative displacement between the footboard and the mounting surface. Additional features of the invention are set forth in the dependent claims.

Principal advantages attained by the invention are that, to fasten the footboard on the foundation, the footboard needs only to be hooked with its two back-reaching elements on the foundation, and is finally fixed by an engagement of the sliding blocking element in the mounting surface of the foundation. Thus a three-point fastening is proposed which obviates the need for a time-consuming application of screws, and thus shortens assembly time. Moreover, the footboard can be removed from the foundation again without tools when necessary.

In a preferred embodiment, each of the two back-reaching elements is constructed in the form of a hook with a free hook end which points in the direction of the motor vehicle floor. Both hooks are thus oriented in opposite directions, so that the footboard can be simply slipped onto the foundation, and the two hooks reach behind the mounting surface.

Advantageously, the foot rest has a sliding element which can simply snap into an opening in the mounting surface with a corresponding position between footboard and mounting surface.

The three fastening elements may proceed from the back of the footboard and engage into corresponding fastening receptacles which are constructed on the mounting surface. Of course, it would also be conceivable to provide at least one of the three fastening elements on the mounting surface and the allocated fastening receptacles on the footboard.

A floor covering, such as a carpet, is arranged between the mounting surface and the footboard so that play existing between the mounting surface and floor board will be equalized by the thickness of the floor covering. The floor covering possesses appropriate openings which correspond to the fastening receptacles in the installation plate.

According to a refinement, the hooks are constructed in an L-shaped form, whereby the short segment of the hook forms a hook root that is connected to the footboard. The length of the segment is adjusted according to the thickness of the floor covering, and is preferably selected such that the footboard is pressed upon the floor covering with a certain force.

It is especially preferred for the footboard to be pulled on the mounting surface when placing the footboard on the foundation, with a corresponding relative shifting of the footboard on the foundation, which is attained by the leading incline on the hook.

In order to be able to equalize any possible play in the direction of operation of the sliding element, a blocking gearing is provided as a sliding block between mounting surface and the reverse side of the footboard. The blocking gearing can, for example, interact with the floor covering and hook there. It would also, however, be conceivable for the blocking gearing to engage on the mounting surface.

BRIEF DESCRIPTION OF THE DRAWINGS

The invention is explained in greater detail below on the basis of embodiments with reference to the drawings.

FIG. 2 is a top view of the footboard, and FIG. 3 is a side view of the footboard.

DETAILED DESCRIPTION OF THE INVENTION

Figure 1:
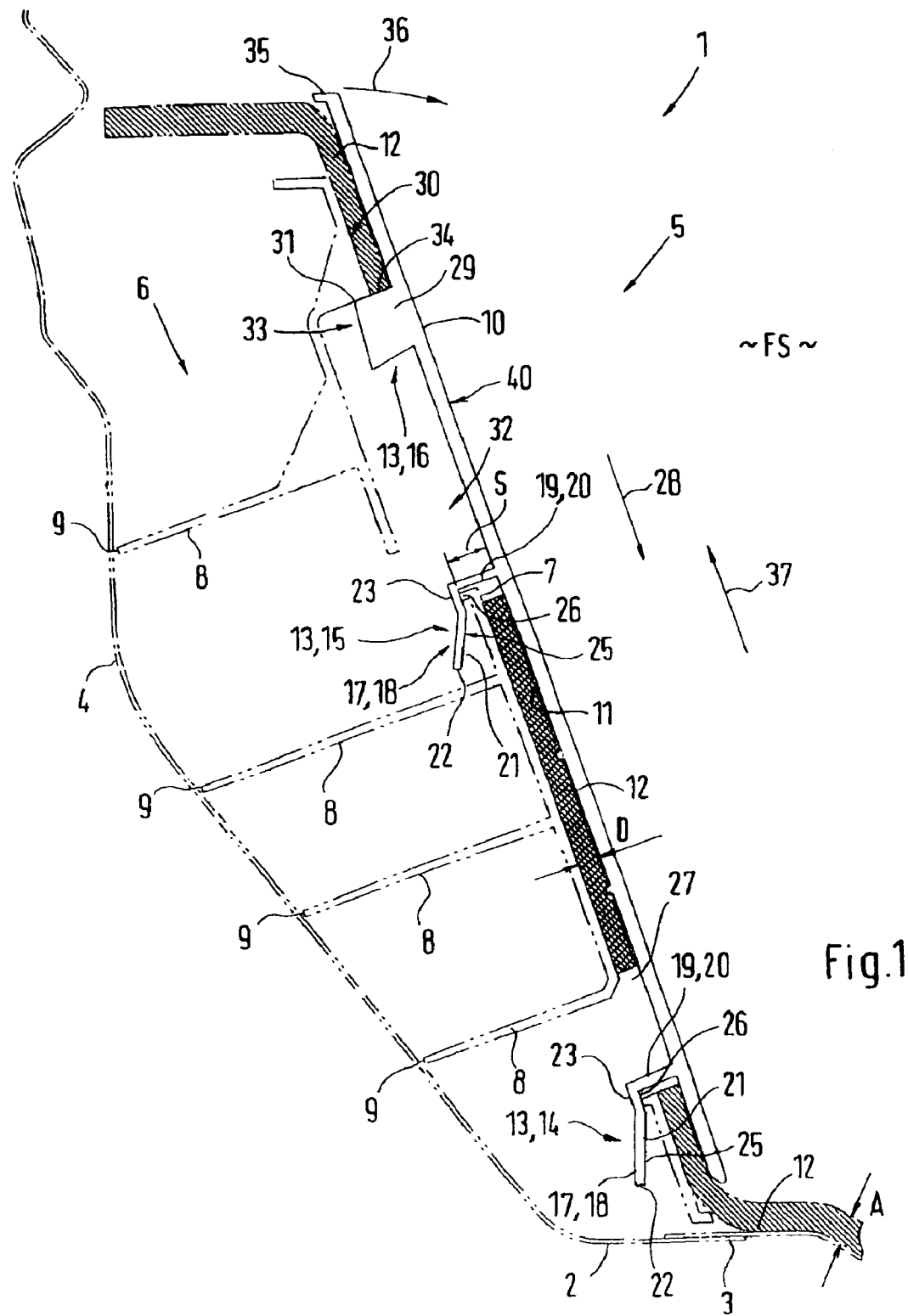
FIG. 1 shows a motor vehicle floor in sectional representation on which a foot rest with its foundation and a footboard is fastened.

In FIG. 1, a motor vehicle interior 1 can be seen in section with a foot space FS of a motor vehicle not further represented here. On a motor vehicle floor 2 with a transition from an approximately horizontal section 3 into an approximately upright standing end wall 4, a foot rest 5 is installed which, in the embodiment shown, is basically allocated to the end wall 4 and is fastened on the latter. Consequently, the foot (not shown) of a driver of the motor vehicle can be placed alongside the pedals (not shown) in the foot space FS of the motor vehicle.

The foot rest 5 possesses a foundation 6, which can be constructed in the form of a hollow body, which has a mounting surface 7 from which several contour bars 8 proceed which extend in the direction toward the end wall 4, so that the ends 9 of said contour bars 8 brace against the end wall 4. The foundation 6 can be fastened in any desired manner on the motor vehicle floor 2, especially on the end wall 4, or if need be constructed in one piece with the motor vehicle floor 2. The mounting surface 7, similarly to the end wall 4, is oriented approximately upright, and consequently runs along the end wall 4 but at a distance from it. A footboard 10 of the foot rest 5 is fastened on the mounting surface 7. A floor covering can lie between the back 11 of the footboard 10 and the mounting surface 7 which otherwise covers the motor vehicle floor 2.

A fastening apparatus 13 is provided for fastening the footboard 10, which is preferably made of plastic, on the mounting surface 7 of the foundation 6 which acts between foundation 6 and footboard 10. It serves for fastening the footboard 10 on the mounting surface 7 and includes fastening elements 14, 15, 16 arranged in series one above the other and at a distance from one another, so as to form at least a three-point fastening. The first, lower fastening element is provided with reference number 14 and the second, upper fastening element is provided with reference number 16. The third, middle fastening element is allocated the reference number 15. The first and third fastening elements 14 and 15 are basically identically constructed in the form of rigid back-reaching elements 17, so that these two fastening elements 14 and 15 will be described below on the basis of the first fastening element 14. Back-reaching element 17 is constructed in the form of a hook 18 which basically has an L-like shape. The short segment 19 of the hook 18 proceeds from the back 11 of the footboard 10 and extends in the direction toward the end wall 4. Consequently, a long segment proceeds bent downward from the segment consequently forming a hook root 20 which has a free hook end 22. The back-reaching segment 21 possesses, in addition to a first segment section 23 running approximately parallel to the footboard 10, a second segment section bent in the direction toward the end wall that consequently runs under an angle toward the back 11 of the footboard 10. Consequently the long back-reaching segment 21 forms a leading incline 25 facing the back 11 of the footboard 10 or exhibits such a leading incline 25, which interacts with an edge 26 of a fastening receptacle 27, constructed in the form of a breakout in the mounting surface, for the back-reaching element 17, so that the edge 26 is accordingly embraced by the back-reaching element 17. When positioning the footboard 10 onto the mounting surface 7, the back-reaching elements 17 of fastening elements 14 and 15 pass through the corresponding fastening receptacles 27. The back-reaching elements 17 are brought into engagement with the respective edge 26 by a downwardly directed sliding motion (arrow 28) and the footboard 10 is further pulled by the leading inclines 25 in the direction of the mounting surface 7.

During the sliding motion of the footboard 10 in the direction of the arrow 28, the second fastening element 16 constructed on the back 11 as a projection 29 first slides along an upper section 30 of the mounting surface 7 or the floor covering 12 and snaps, when appropriately slid into position (a relative position between mounting surface 7 and footboard 10) onto an edge 31 of a further fastening receptacle, clamps down in this fastening receptacle 32 and forms with the edge 31 a snap apparatus which represents a slide locking element 22 for the footboard 10 through which a relative displacement between footboard 10 and mounting surface 7 is prevented. It is, in particular, provided that the projection 29 is outfitted with a planar or straight locking surface 34 which faces the edge 31. Should the footboard 10 once again be removed from the foundation 6, its upper end 35 is simply bent away in the direction of the arrow 36 until the locking surface 34 comes out of engagement with the edge 31. Subsequently the footboard 10 is pulled away against the direction of the arrow 28 in the direction of the arrow 37 and consequently removed from the foundation 6. The footboard 10 is made, for example, of pliable plastic.

As already mentioned, the floor covering 12 lies between the back 11 of the footboard 10 and the mounting surface 7 that has a thickness D in between. This thickness D is brought about by the segment length S of the short segment 19 of the hook 18 since, when installing the footboard 10 on the mounting surface, the floor covering 12 is fastened from its initial thickness A to its compressed thickness D when the footboard 10 is pulled through the leading inclinations 25 to the mounting surface. In this way, a certain spring force is build up between mounting surface 7 and footboard 10 that makes possible a secure, rattle-proof retention of the footboard 10 on the foundation 6 and moreover prevents a relative displacement of the footboard 10 on the foundation 6 to a certain extent. The floor covering 12 is provided with corresponding openings for fastening elements 14, 15 and 16 in the area of fastening receptacles 27 and 32.

Additionally or alternatively, a gearing 39 can (as depicted in FIG. 3) be provided as blocking gearing on a longitudinal pin 38 originating from the back 11 that acts as a sliding block between footboard 10 and mounting surface 7 and avoids a relative displacement of the footboard 10 on the mounting surface in the direction of operation (identified by arrows 28 and 37) of the sliding blocking element 33. This blocking gearing 39 is constructed in the form of a sawtooth gearing and can pass through the floor covering 12 in openings and interact with a corresponding matching gearing (not represented) on the mounting surface 7 and/or hood on the floor covering 12. Consequently a relative displacement between footboard 10 and foundation 6 in the direction of operation (arrows 28 and 37) can be prevented, so that a certain play between locking surface 34 and edge 31 or short segment 19 and edge 26 does not lead to a slipping of the footboard 10 on the foundation 6.

The footboard 10 has, in accordance with FIG. 2, an anti-slip apparatus on its tread side 40 opposite the back that can, for example, be furnished by a structure having elevations, elevations incorporated into the tread side 40, or a corresponding coating on this tread side 40.

It is furthermore apparent from FIGS. 2 and 3 that the lower fastening element 14 can have two back-reaching elements 17, especially hook 18, lying side by side, that are basically constructed identically, so that the following description applies for these two hooks 18. FIG. 3, moreover, shows that the sliding locking element 33 with its projection 29 and the third fastening element 15 are realized in one piece. The footboard 10 with fastening elements 14, 15 and 16 as well as the blocking gearing 39 can furthermore be manufactured in one piece as plastic parts. For the rest, parts which are identical or act identically are provided with the same reference numbers in FIGS. 1 to 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A foot rest mountable on a motor vehicle floor comprising:
 a foundation with a mounting surface,
 a footboard, and
 a fastening apparatus operating between the foundation and the footboard which holds the footboard on the mounting surface,
 wherein the fastening apparatus has a lower first fastening element constructed as a rigid back-reaching element and an upper, second fastening element, wherein the fastening apparatus additionally possesses, between the upper and lower fastening elements, a third fastening element constructed as a rigid back-reaching element, and wherein the upper fastening element is constructed as a slide blocking element which blocks a relative displacement between the footboard and the mounting surface.

2. The foot rest according to claim 1, wherein the slide blocking element is connected as a snap connection.

3. The foot rest according to claim 1, wherein each back-reaching element is constructed as a hook having a free hook end which points in the direction of the motor vehicle floor.

4. The foot rest according to claim 1, wherein the slide blocking element is constructed as a projection with a straight blocking surface.

5. The foot rest according to claim 1, wherein the fastening elements proceed from a back of the footboard facing the mounting surface, and wherein corresponding fastening receptacles are constructed for the fastening elements on the mounting surface.

6. The foot rest according to claim 1, wherein a floor covering is arranged between the mounting surface and the footboard.

7. The foot rest according to claim 3, wherein each hook is constructed in an L-shaped form with a short segment which forms a hook root connected with the footboard and which has a segment length which is harmonized with a floor covering lying between the mounting surface and the footboard, and a long segment which has the free hook end.

8. The foot rest according to claim 7, wherein at least the long segment of the third fastening element is outfitted with a leading incline facing a back of the footboard.

9. The foot rest according to claim 1, wherein a blocking gearing is provided between the mounting surface and the footboard as a slide block.

10. The foot rest according to claim 2, wherein the slide blocking element is constructed as a projection with a straight blocking surface.

11. The foot rest according to claim 2, wherein the fastening elements proceed from a back of the footboard facing the mounting surface, and wherein corresponding fastening receptacles are constructed for the fastening elements on the mounting surface.

12. The foot rest according to claim 3, wherein the fastening elements proceed from a back of the footboard facing the mounting surface, and wherein corresponding fastening receptacles are constructed for the fastening elements on the mounting surface.

13. The foot rest according to claim 4, wherein the fastening elements proceed from a back of the footboard facing the mounting surface, and wherein corresponding fastening receptacles are constructed for the fastening elements on the mounting surface.

14. The foot rest according to claim 10, wherein the fastening elements proceed from a back of the footboard facing the mounting surface, and wherein corresponding fastening receptacles are constructed for the fastening elements on the mounting surface.

15. The foot rest according to claim 2, wherein a floor covering is arranged between the mounting surface and the footboard.

16. The foot rest according to claim 3, wherein a floor covering is arranged between the mounting surface and the footboard.

17. The foot rest according to claim 4, wherein a floor covering is arranged between the mounting surface and the footboard.

18. The foot rest according to claim 5, wherein a floor covering is arranged between the mounting surface and the footboard.

19. The foot rest according to claim 10, wherein a floor covering is arranged between the mounting surface and the footboard.

20. The foot rest according to claim 11, wherein a floor covering is arranged between the mounting surface and the footboard.

21. The foot rest according to claim 12, wherein a floor covering is arranged between the mounting surface and the footboard.

22. The foot rest according to claim 13, wherein a floor covering is arranged between the mounting surface and the footboard.

23. The foot rest according to claim 14, wherein a floor covering is arranged between the mounting surface and the footboard.

24. The foot rest according to claim 2, wherein a blocking gearing is provided between the mounting surface and the footboard as a slide block.

25. The foot rest according to claim 3, wherein a blocking gearing is provided between the mounting surface and the footboard as a slide block.

26. The foot rest according to claim 4, wherein a blocking gearing is provided between the mounting surface and the footboard as a slide block.

27. The foot rest according to claim 5, wherein a blocking gearing is provided between the mounting surface and the footboard as a slide block.

28. The foot rest according to claim 6, wherein a blocking gearing is provided between the mounting surface and the footboard as a slide block.

29. The foot rest according to claim 7, wherein a blocking gearing is provided between the mounting surface and the footboard as a slide block.

30. The foot rest according to claim 8, wherein a blocking gearing is provided between the mounting surface and the footboard as a slide block.

* * * * *